United States Patent [19]

Mügge et al.

[11] Patent Number: 5,478,620
[45] Date of Patent: Dec. 26, 1995

[54] MULTILAYER PLASTIC PIPE

[75] Inventors: Joachim Mügge; Hubertus Ohm, both of Haltern; Hans-Dieter Herrmann; Hans Ries, both of Marl, all of Germany

[73] Assignee: Huels Aktiengesellschaft, Marl, Germany

[21] Appl. No.: 203,481

[22] Filed: Feb. 28, 1994

Related U.S. Application Data

[63] Continuation-in-part of Ser. No. 833,701, Feb. 11, 1992, abandoned.

[30] Foreign Application Priority Data

Apr. 18, 1991 [DE] Germany .................. 41 12 662.9

[51] Int. Cl.[6] .................................................. B29D 23/00
[52] U.S. Cl. .................... 428/36.91; 428/36.9; 138/137; 138/141; 138/125; 138/127; 138/118.1
[58] Field of Search .................................... 138/137, 141, 138/125, 127, 118.1, DIG. 1; 428/475.2, 475.4, 474.7, 474.9, 475.5, 36.9, 36.91, 36.92, 35.7, 36.6, 36.7

[56] References Cited

U.S. PATENT DOCUMENTS

| | | | |
|---|---|---|---|
| 3,233,024 | 2/1966 | Jackson et al. | 264/173 |
| 3,584,656 | 6/1971 | Assendelet et al. | 232/27 |
| 4,443,519 | 4/1984 | Donermeyer et al. | 428/336 |
| 4,725,488 | 2/1988 | Swan et al. | 428/248 |
| 4,800,109 | 1/1989 | Washizu | 428/34.9 |
| 5,038,833 | 8/1991 | Brunnhofer | 138/137 |
| 5,084,352 | 1/1992 | Percec et al. | 428/412 |
| 5,258,213 | 11/1993 | Mügge et al. | |

FOREIGN PATENT DOCUMENTS 3827092  9/1989  Germany .

OTHER PUBLICATIONS

Patent Abstracts of Japan, vol. 9, No. 21 (C–263), Jan. 29, 1985, JP–A–59 168–059, Sep. 21, 1984.

*Primary Examiner*—James J. Seidleck
*Assistant Examiner*—Michael A. Williamson
*Attorney, Agent, or Firm*—Oblon, Spivak, McClelland, Maier, & Neustadt

[57] ABSTRACT

Multilayer plastic pipes comprising a polyamide-based inner and outer layer, wherein the inner and outer layer are connected force-lockingly by means of at least one intermediate layer made of a mixture of a linear crystalline polyester and a polyamide, have improved stability to chemical agents and improved mechanical properties.

9 Claims, No Drawings

MULTILAYER PLASTIC PIPE

This application is a continuation-in-part of application Ser. No. 07/833,701, filed on Feb. 11, 1992, now abandoned.

BACKGROUND OF THE INVENTION

Field of the Invention

The present invention relates to multilayer plastic pipe comprising a polyamide-based inner and outer layer.

Discussion of the Background

Plastic pipes made of polyamide are known and are used for a variety of applications. To fulfill their task, the pipes must be, among other things, inert to the medium flowing through them, and stable to high and low temperatures and mechanical stresses.

Single layer pipes are not always able to fulfill the necessary requirements. During transport of, e.g., aliphatic or aromatic solvents, fuels, or the like, they show significant drawbacks such as an insufficient barrier effect against the medium, undesired changes in dimensions or too little mechanical load bearing capacity.

An attempt was made to eliminate these drawbacks with multilayer pipes (DE-OSS 35 10 395 (corresponds to U.S. Pat. No. 5,038,833), 37 15 251 (corresponds to UK 2 204 376), 38 21 723, 38 27 092). The practical application of these proposals has shown, however, that individual drawbacks can be avoided, but the whole picture with respect to the physical properties is still unsatisfactory.

Thus, there remains a need for polyamide pipe with good barrier effect against the transported medium, satisfactory dimensional stability, and satisfactory mechanical load bearing capacity.

Summary of the Invention

Accordingly, it is one object of the present invention to provide novel polyamide pipe with a good barrier effect against the transported medium.

It is another object of the present invention to provide polyamide pipe with good dimensional stability.

It is another object of the present invention to provide polyamide pipe with good mechanical load bearing capacity.

These and other objects, which will become apparent during the following detailed description, have been achieved by the inventors' discovery that, by connecting together force-lockingly the inner and outer layer of the pipe by means of at least one intermediate layer made of a mixture of a linear crystalline polyester and a polyamide, pipes having good properties are obtained.

Detailed Description of the Preferred Embodiments

Suitable polyamides are primarily aliphatic homo- and copolycondensates. Examples are the 4,6-; 6,6-; 6,12-; 8,10-; 10,10-polyamides or the like. Preferred are 6-; 10,12-; 11-; 12- and 12,12-polyamides. The nomenclature of the polyamides corresponds to the international standard, where the first number(s) indicate(s) the carbon atom number of the starting diamine and the last number(s) indicate(s) the carbon atom number of the dicarboxylic acid. If only one number is given, this means that the polyamide is prepared from an α,ω-aminocarboxylic acid or from the lactam derived from it (see: H. Domininghaus, "The Plastics and their Properties" page 272, VDI Verlag (1976)).

If copolyamides are used, they can contain, e.g., adipic acid, sebacic acids, suberic acid, isophthalic acid, terephthalic acid as the coacid or bis(4'-aminocyclohexyl)methane, trimethylhexamethylenediamine, hexamethylenediamine as the codiamine.

The preparation of these polyamides is known (e.g., D. B. Jacobs, J. Zimmermann; *Polymerization Processes*, pages 425–67; Interscience Publishers, New York (1977); and DE-AS 2 152 194).

Mixed aliphatic/aromatic polycondensates, as described, e.g., in U.S. Pat. Nos. 2,071,250; 2,071,251; 2,130,523; 2,130,948; 2,241,322; 2,312,966; 2,512,606; 3,393,210 or in Kirk-Othmer, *Encyclopedia of Chemical Technology*, 3rd. ed., vol. 18, pages 328 and 435, Wiley & Sons (1982), are also suitable as polyamides.

To the extent that it is necessary, the polyamides can also be made impact resistant. Suitable impact modifying components are products known, such as ethylene/propylene or ethylene/propylene/diene-copolymers (e.g., EP-OS 0 295 076); statistically or block-like synthesized copolymers comprising alkenyl aromatic compounds with aliphatic olefins or dienes (e.g., EP-OS 0 261 748); rubber types with a core/shell structure based on the (methy)acrylates, styrene, butadiene or the like (e.g., DE-OSS 37 28 685; 21 44 528), that can be functionalized optionally in accordance with the state of the art.

Polycondensates that are suitable as polyamides are also poly(ether ester amides) or poly(ether amides). Such products are described, e.g., in DE-OSS 27 12 987, 25 23 991, 30 06 961.

The molecular weight (number average) of the polyamides is suitably above 5,000, preferably above 10,000—in accordance with a relative viscosity ($\eta_{rel}$) ranging from 1.5 to 2.8.

The cited polyamides may be used alone or in mixtures.

Suitable linear crystalline polyesters have the following general structure formula (I)

where R is a divalent branched or unbranched aliphatic and/or cycloaliphatic group having 2 to 12, preferably 2 to 8 carbon atoms in the carbon chain and R' is a divalent aromatic group having 6 to 20, preferably 8 to 12 carbon atoms in the carbon skeleton.

The linear crystalline polyesters may be prepared by condensing a diol with a diacid.

Examples of suitable diols are ethylene glycol, trimethylene glycol, tetramethylene glycol, hexamethylene glycol, neopentyl glycol, cyclohexanedimethanol, or the like.

Up to 25 mol % of the cited diol can be replaced by a second diol already cited above or by a diol with the following general formula (II)

where R" is a divalent group having 2 to 4 carbon atoms and x can assume a value from 2 to 50.

Preferred diols are ethylene glycol and tetramethylene glycol.

A suitable aromatic dicarboxylic acid is, e.g., terephthalic acid, isophthalic acid, 1,4-; 1,5-; 2,6- or 2,7-naphthalene dicarboxylic acid, diphenic acid, diphenyl ether-4,4'-dicarboxylic acid.

Up to 20 mol % of these dicarboxylic acids can be replaced by aliphatic dicarboxylic acids such an succinic acid, maleic acid, fumaric acid, sebacic acid, dodecanedioic acid, etc.

The preparation of linear, crystalline polyesters is conventional in the art (DE-OSS 24 07 155, 24 07 156; Ullmann's Encyclopädie der technischen Chemie, 4th ed., vol. 19, page 65 ff.— Verlag Chemie GmbH, Weinheim, 1980).

The viscosity number, J, of the linear crystalline polyester of formula (I) is suitably 75 to 200 ml/g, preferably 100 to 175 ml/g, as measured in a 0.5 wt. % solution in an o-dichlorobenzene/phenol mixture (50:50 parts by weight) at 25° C. in accordance with DIN 53 728.

The compounds of polyamide and polyester that are used as the intermediate layer of the present invention may be prepared by mixing in any known manner. This mixture can also be further processed in the sense that the pellet mix is melted, e.g., in an extruder, mixed and repelletized. However, it is also possible to provide such a melt mixture additionally with catalysts and to convert in a known manner into copolycondensates (e.g. DE-AS 19 40 660; DE-OS 23 08 572; EP-OS 84 643).

Polyesters and polyamides are added to the intermediate layer in a weight ratio ranging from 30 to 70:70 to 30, preferably 40 to 60:60 to 40.

Conventional auxiliaries and additives such as stabilizers, processing aids, viscosity improvers, pigments, etc. can be added to the polyamide or polyester compounds.

Reinforcers or fillers such an glass fibers or glass beads, carbon fibers or mineral fibers can also be added to the polyamides intended for pipe application.

The multilayer plastic pipes can be manufactured in a known manner as described above, e.g., in the references cited in the discussion of the background. These references are incorporated herein by reference.

Although the exact dimensions of the present multilayer pipe may vary with the application for which the pipe is intended, good results have been achieved with pipes having: an outer polyamide layer with a thickness of 0.25 to 2.0 mm, preferably 0.50 to 1.5 mm, most preferably about 0.75 mm; an intermediate layer with a thickness of 0.05 to 0.25 mm, preferably 0.10 to 0.20 mm, most preferably about 0.15 mm; and an inner layer with a thickness of 0.05 to 0.15 mm, preferably 0.075 to 0.125 mm, most preferably about 0.10 mm. The external diameter may be 1 to 20 mm, preferably 5 to 15 mm, most preferably about 8 mm.

The multilayer plastic pipes of the invention exhibit an excellent stability and good barrier effect to diffusion with respect to transported media, in particular chemical agents, solvents, and fuels. Furthermore, the two polyamide layers are connected together so force-lockingly by means of the intermediate layer that the different layers do not shear, e.g., during thermal expansion or bending of the pipe. In addition to a three-layer pipe, pipes can also be manufactured that are made, e.g., of 5 or 7 layers by incorporating other layers made of polyamide or of polyamide/polyester.

Having generally described the invention, a further understanding can be obtained by reference to certain specific examples which are provided herein for purposes of illustration only and are not intended to be limiting unless otherwise specified.

EXAMPLES

The results given in the examples were determined with the aid of the following measuring methods.

The viscosity of the solution (viscosity number J) of the polyesters was determined by using a 0.5 wt. % solution in an o-dichlorobenzene/phenol mixture (50:50 parts by weight) at 25° C. in accordance with DIN 53 728.

The viscosity of the solution (rel. viscosity, $\eta_{rel}$) of the polyamides was determined by using a 0.5 wt. % cresol solution at 25° C. in accordance with DIN 53 727.

The diffusion of the fuel content was determined on sheetings by filling 50 ml of a fuel mixture (fuel M 15—42.5 parts by volume of isooctane, 42.5 parts by volume of toluene and 15 parts by volume of methanol) into a cylindrical container (diameter 5 cm, height 3 cm), which is sealed with the sheeting to be tested. The diffusion is determined at 23°± 1° C. as loss in weight through diffusion over time (measurement every 24 hours). The maximum weight loss registered per area was given as the measure.

The frictional connection between the individual layers is determined with the aid of multilayer pipes or sheetings. In so doing, an attempt is made to separate the layers manually from one another, i.e., by bending the pipes or sheetings with subsequent separation test with a cutting tool and cross cutting. Pipes and sheetings are then categorized as "good" if the layers did not separate. Separation within a layer leads to the same categorization. Pipes and sheetings in which two layers separated are labelled "poor".

Tests that are labelled with letters are Comparative Examples, outside the scope of the present invention.

Examples

Added polycondensates
Polyamide components for the inner and outer layer:
  PA 1: polyamide 12 ($\eta_{rel}$ 1.9; amino end group content 80 mmol/kg)
  PA 2: polyamide 12 (VESTAMID® L 2140; $\eta_{rel}$ 2.1)
  PA 3: polyamide 12 (VESTAMID® L 2124; $\eta_{rel}$ 2.1 containing plasticizer)
Components for the intermediate layer:
  Z1:
    50 parts by weight of polyamide 12 ($\eta_{rel}$: 1.91; amino end group content: 80 mmol/kg; carboxyl end group content: 20 mmol/kg), 50 parts by weight of homo-poly(butylene terephthalate) (viscosity number J: 155 ml/g; carboxyl group content; 40 mmol/kg) and 0.1 parts by weight of triphenyl phosphite are continuously melt-mixed, extruded and granulated in a twin screw compounder rotating in the same direction (Leistritz model 30.34—jacket temperature: 260° C.; mass flow rate: 3 kg/h; screw velocity: 50 min$^{-1}$).
  Z2:
    50 parts by weight of polyamide 12 ($\eta_{rel}$: 1.91; amino end group content: 80 mmol/kg; carboxyl end group content: 20 mmol/kg), 50 parts by weight of homo-poly(butylene terephthalate) (viscosity number J: 155 ml/g; carboxyl group content, 40 mmol/kg) and 0.1 parts by weight of dibutyl tin oxide are continuously melt-mixed, extruded and granulated in a twin screw compounder rotating in the same direction (Leistritz model 30.34—jacket temperature: 260° C.; mass flow rate: 3 kg/h; screw velocity: 50 min$^{-1}$).
  Z3:
    100 parts by weight of homo-poly(butylene terephthalate) with predominantly hydroxyl end groups (J: 105 ml/g; OH: 80 mmol/kg, COOH: 20 mmol/kg)

are converted with 11 parts by weight of a multifunctional commercially available isocyanate (IPDI T 1890-Hüls-AG) in the melt at 250° C. and subsequently remelted, extruded, and granulated with a polyamide 12 ($\eta_{rel}$: 1.91; amino end group content: 80 mmol/kg; carboxyl end group content: 20 mmol/kg ).

Z4:
Ethylene vinyl alcohol copolymer, EVAL® EPF 101 A (Kurarai Company)

Z5:
Polyethylene, VESTOLEN® A 4042 (Hüls AG)

Manufacture of sheetings and pipes

The sheetings are manufactured on a laboratory three layer sheeting system with a 400 mm three layer flat film die and a following three roller polishing stack. The extruder temperature during manufacture of the sheetings is set at 185° C. (PA 3); 200° C. (PA 1 and PA 2); 220° C. (Z5); 225° C. (Z4) and 245° C. (Z1 to Z3).

Pipes with 8 mm dimensions (outer diameter)×1 mm (overall wall thickness) and three layer construction are manufactured on a laboratory pipe extrusion system with a five layer pipe tool (outer layer: approximately 0.75 mm, intermediate layer; approximately 0.15 mm, inner layer: approximately 0.1 mm). All of the feed extruders exhibit a screw diameter of 25 mm. The cylinder temperature was at 220° C. (PA 3); 230° C. (PA 1, PA 2); 260° C. (Z1 to Z3); 240° C. (Z5); 200° C. (Z4).

TABLE I

| test | inner layer | intermediate layer | outer layer | frictional connection | diffusion ($g \cdot d^{-1} \cdot m^{-2}$) |
| --- | --- | --- | --- | --- | --- |
| 1 F*) | PA 1 | Z 1 | PA 1 | good | 150 |
| 2 F | PA 2 | Z 1 | PA 2 | good | 155 |
| 3 F | PA 3 | Z 2 | PA 1 | good | 140 |
| 4 F | PA 2 | Z 3 | PA 3 | good | 170 |
| 5 F | PA 3 | Z 1 | PA 3 | good | 156 |
| 6 R*) | PA 2 | Z 1 | PA 2 | good | — |
| 7 R | PA 3 | Z 3 | PA 3 | good | — |
| A F | PA 2 | Z 4 | PA 2 | poor | 190 |
| B F | PA 3 | Z 5 | PA 1 | poor | 135 |
| C R | PA 2 | Z 4 | PA 2 | poor | — |
| D F | PA 3**) | — | — | — | 1240 |
| E F | PA 2**) | — | — | — | 635 |

*) F = multilayer sheeting (layer thickness: approximately 0.1 mm)
R = multilayer pipe
**) single layer sheeting (layer thickness: approximately 0.1 mm)

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A multilayer plastic pipe, comprising polyamide inner and outer layers, wherein said inner and outer layers are connected by means of at least one intermediate layer comprising (i) a mixture of a linear crystalline polyester and a polyamide or (ii) a polyester/polyamide copolymer, wherein said polyester and polyamide are present in a weight ratio ranging from 30 to 70:70 to 30.

2. The multilayer plastic pipe of claim 1, wherein said intermediate layer is a mixture of a crystalline polyester and a polyamide.

3. The multilayer plastic pipe of claim 1, wherein said intermediate layer is a polyester/polyamide copolymer.

4. The multilayer plastic pipe of claim 1, wherein said polyester and polyamide in said intermediate layer are present in a weight ratio ranging from 40 to 60:60 to 40.

5. The multilayer plastic pipe of claim 1, wherein said polyester in said intermediate layer is obtained by (poly-)condensing an aliphatic diol, an alicyclic diol, or a mixture thereof with an aromatic dicarboxylic acid.

6. The multilayer plastic pipe of claim 1, wherein said intermediate layer comprises at least one polyamide selected from the group consisting of 4,6-; 6-; 6,6-; 6,12-; 8,10-; 10,10-; 10,12-; 11-; 12-; and 12,12-polyamide.

7. The multilayer plastic pipe of claim 1, which is a fuel pipe.

8. The multilayer plastic pipe of claim 1, which is an automobile fuel line.

9. A multilayer plastic pipe having polyamide inner and outer layers, wherein said inner and outer layers are connected by means of an intermediate layer consisting of (i) a mixture of a linear crystalline polyester and a polyamide or (ii) a polyester/polyamide copolymer, wherein said polyester and polyamide are present in a weight ratio ranging from 30 to 70:70 to 30.

\* \* \* \* \*